(12) United States Patent
Mizoguchi

(10) Patent No.: US 7,502,417 B2
(45) Date of Patent: Mar. 10, 2009

(54) DATA TRANSMISSION DEVICE AND METHOD

(75) Inventor: Michiko Mizoguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 633 days.

(21) Appl. No.: 10/688,245

(22) Filed: Oct. 17, 2003

(65) Prior Publication Data
US 2004/0086051 A1 May 6, 2004

(30) Foreign Application Priority Data
Oct. 18, 2002 (JP) ............................. 2002-304166

(51) Int. Cl.
*H04N 7/18* (2006.01)
(52) U.S. Cl. .............................. 375/240.28; 375/240.26
(58) Field of Classification Search ................................ 375/240.01–240.29
See application file for complete search history.

(56) References Cited

U.S. PATENT DOCUMENTS 6,014,694 A * 1/2000 Aharoni et al. ............. 709/219

FOREIGN PATENT DOCUMENTS

| JP | 7-193820 | 7/1995 |
| JP | 8-307876 | 11/1996 |
| JP | 10-023427 | 1/1998 |
| JP | 2000-341690 | 12/2000 |

OTHER PUBLICATIONS

Japanese Office Action issued Jul. 24, 2007, from the corresponding Japanese Application.

* cited by examiner

*Primary Examiner*—Andy S Rao
(74) *Attorney, Agent, or Firm*—Katten Muchin Rosenman LLP

(57) ABSTRACT

A data transmission device for generating a plurality of compressed/encoded data of different bit rates from a single video signal, whereby unevenness in the amount of generated data can be easily reduced. A synchronizing signal detection section detects a synchronizing signal from the input video signal and supplies the detected signal to a timing control section. Compressing/encoding sections compress/encode the same video signal input thereto to generate data streams of different bit rates. The timing control section controls the compressing/encoding sections in accordance with the synchronizing signal detected by the synchronizing signal detection section such that timings for starting compression/encoding processes in the compressing/encoding sections are offset in units of frame. A multiplexing section generates fragmented packets carrying the individual data streams in accordance of amounts of data generated per unit time by the respective compressing/encoding sections, and sequentially transmits the fragmented packets at equal intervals within the unit time.

5 Claims, 9 Drawing Sheets

DATA TRANSMISSION DEVICE AND METHOD

BACKGROUND OF THE INVENTION (1) Field of the Invention

The present invention relates to a data transmission device and method for generating a plurality of compressed/encoded data of different bit rates from a single video signal and simultaneously transmitting the generated data onto a network, and more particularly, to a data transmission device and method applicable to real-time transmission of such compressed/encoded data.

(2) Description of the Related Art

Recent image compression/encoding techniques such as MPEG (Moving Picture Experts Group) have made it easy to deliver moving picture data over networks. However, in the case of delivering such data through the Internet in particular, the delivered data may possibly be transferred via analog telephone lines or ISDN (Integrated Services Digital Network) lines, and broadband communication is not necessarily available to every recipient. Under the present circumstances, therefore, it is necessary that the resolution be lowered or the compression ratio be increased to permit data to be delivered at a relatively low bit rate.

In view of this, a moving picture data delivery scheme has been conceived wherein two types of data, that is, one for delivery to a relatively broadband network, such as an intranet in a corporation, and the other for delivery to a relatively narrowband network, such as the Internet, are generated from a single video source and are delivered simultaneously. For example, for a broadband network, a data stream compressed/encoded according to MPEG-2 is delivered at a bit rate of about 6 Mbps, and for a narrowband network, a data stream compressed/encoded according to MPEG-4 is delivered at a bit rate of about 100 kbps.

Heretofore, when generating a plurality of data streams for delivery at different bit rates from a single video source, encoders equal in number to the data streams to be generated are used to encode data distributed from the video source. Alternatively, a transcoder or the like is used to decode the data stream for broadband delivery and then to again encode the decoded data stream to obtain a data stream for narrowband delivery.

However, the delivery of moving picture data has now become so popularized that there is a strong demand for reduction in cost of deliverer-side systems as well as in size of such systems to save installation space. Also, in recent years, real-timeliness or simultaneity of delivered data is often given importance especially in cases where the water levels of rivers or dams, roads, etc. are monitored from a remote location or a conference or a concert is broadcast live. Accordingly, there has been proposed an idea of incorporating a plurality of encoder engines into a single encoder, to generate a plurality of data streams of different bit rates and deliver the generated data streams simultaneously.

Meanwhile, in the case of data which has been compressed/encoded by using inter-frame prediction as in MPEG, an appreciable difference often occurs between the data amount of a picture which can be decoded by its own data only and the data amount of a picture which has been generated using the inter-frame prediction. Accordingly, the processing load greatly varies during the image encoding/decoding process, and also when such data is transmitted over a network, an actual amount of transmitted data can momentarily rise well above the average bit rate.

As regards techniques for generating data by encoding individual objects of image and then multiplexing the encoded objects, there has been proposed a method in which the start timings for encoding objects are offset in accordance with the ranges of variations in the amount of code generated per frame for the individual objects, to smooth variation in the amount of generated code as well as in the processing load (e.g., Japanese Unexamined Patent Application No. H10-023427 (cf. Paragraph Nos. [0037] to [0051], FIG. 5)).

Thus, the compression/encoding techniques using the inter-frame prediction as in MPEG are associated with a problem that the amount of generated code varies over a wide range, as mentioned above. Especially in the case where a plurality of compressed/encoded data of different bit rates are generated from a single video source and are delivered simultaneously, the amount of generated code varies over an even wider range, giving rise to a problem that data cannot be received properly where the amount of data transmitted onto the network momentarily increased.

FIG. 9 illustrates variation in the amount of data observed when a plurality of compressed/encoded data of different bit rates are simultaneously delivered, wherein FIG. 9(A) shows exemplary arrangements of pictures in respective data streams generated according to MPEG-2, and FIG. 9(B) is a graph showing a total amount of data generated with respect to each picture.

In FIG. 9(A) is illustrated the case where two data streams A and B of different bit rates are generated from a single video source by two encoders. A data stream encoded according to MPEG-2 (or MPEG-1) comprises an I picture encoded in a closed manner within a frame, a P picture encoded using forward prediction, and a B picture encoded using bidirectional prediction. The data streams A and B shown in FIG. 9(A) have a general picture arrangement in which one I or P picture is preceded and followed by two B pictures. A GOP (Group Of Pictures) is a unit that allows playback of the data stream in the middle, and one GOP always includes one or more I pictures. In the illustrated example, a fixed number of pictures constitutes one GOP.

Since the I picture is generated by closed encoding within a frame, its data amount is noticeably large, compared especially with the B picture. In a data stream having a picture arrangement as shown in FIG. 9(A), the data amount of I pictures accounts for nearly 1/3 of the total amount of the data stream.

In the illustrated example, every twelve pictures include one I picture, and therefore, in terms of an average data delivery rate per second, half of the amount of data delivered during a period of 11/12 second is delivered within the remaining period of 1/12 second at a time. Where the data stream has an average bit rate of 6 Mbps, for example, there is a possibility that data is generated at an instantaneous rate of 24 Mbps when an I picture is generated. Further, since the bit rate of 24 Mbps is a value that applies to the case where data is delivered uniformly during a period of 1/12 second, data can possibly be transmitted at an even higher rate if the data is transmitted at a time as soon as it is generated.

Also, in the case where multiple data streams are encoded simultaneously by multiple encoder engines incorporated in a single encoder, the encoding processes are usually started at the same time and I, B and P pictures are generated at respective identical positions, as shown in FIG. 9(A). Consequently, at the timing when I pictures are generated for the respective data streams, the total amount of generated data sharply increases for a moment. For example, where the average bit rates of the data streams A and B are 6 Mbps and 3 Mbps, respectively, the data generation rate reaches 36 Mbps (=24

Mbps+12 Mbps) at its peak. Such extreme unevenness in the amount of generated data instantaneously increases the load on the network for transmitting data and causes packet loss etc.

It is possible to generate encoded data in such a manner as to reduce unevenness in the amount of generated data. In this case, however, it is necessary that the encoder be provided therein with a large-capacity buffer to encode data while temporarily storing a considerable amount of data. As a result, the transmission of data is delayed behind the original video, thus impairing the simultaneity. Also, complex control is required, which leads to an increase in cost of the device.

SUMMARY OF THE INVENTION

The present invention was created in view of the above circumstances, and an object thereof is to provide a data transmission device which permits unevenness in the amount of generated data to be reduced with ease in the case where a plurality of compressed/encoded data of different bit rates are generated from a single video signal.

Another object of the present invention is to provide a data transmission method which permits unevenness in the amount of generated data to be reduced with ease in the case where a plurality of compressed/encoded data of different bit rates are generated from a single video signal.

To achieve the first object, there is provided a data transmission device for generating a plurality of compressed/encoded data of different bit rates from a single video signal and simultaneously transmitting the compressed/encoded data onto a network. The data transmission device comprises a synchronizing signal detection section for detecting a synchronizing signal from the video signal input thereto, a plurality of compressing/encoding sections for compressing/encoding the video signal to generate data streams of different bit rates, respectively, a timing control section for controlling the compressing/encoding sections in accordance with the detected synchronizing signal such that timings for starting compression/encoding processes in the compressing/encoding sections are shifted from one another in units of frame, and a multiplexing section for sequentially multiplexing the data streams generated by the respective compressing/encoding sections and transmitting the multiplexed data onto the network.

Also, to achieve the second object, there is provided a data transmission method for generating a plurality of data streams of different bit rates by compressing/encoding a single video signal and for simultaneously transmitting the data streams onto a network. The data transmission method comprises the step of detecting a synchronizing signal from the input video signal, the step of shifting start timings for compression/encoding processes corresponding to the generation of the respective data streams from one another in units of frame in accordance with the detected synchronizing signal, and the step of generating fragmented packets carrying the individual data streams in accordance with amounts of data generated per unit time by the respective compression/encoding processes, and transmitting the fragmented packets onto the network at equal intervals within the unit time.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

Figure 1:
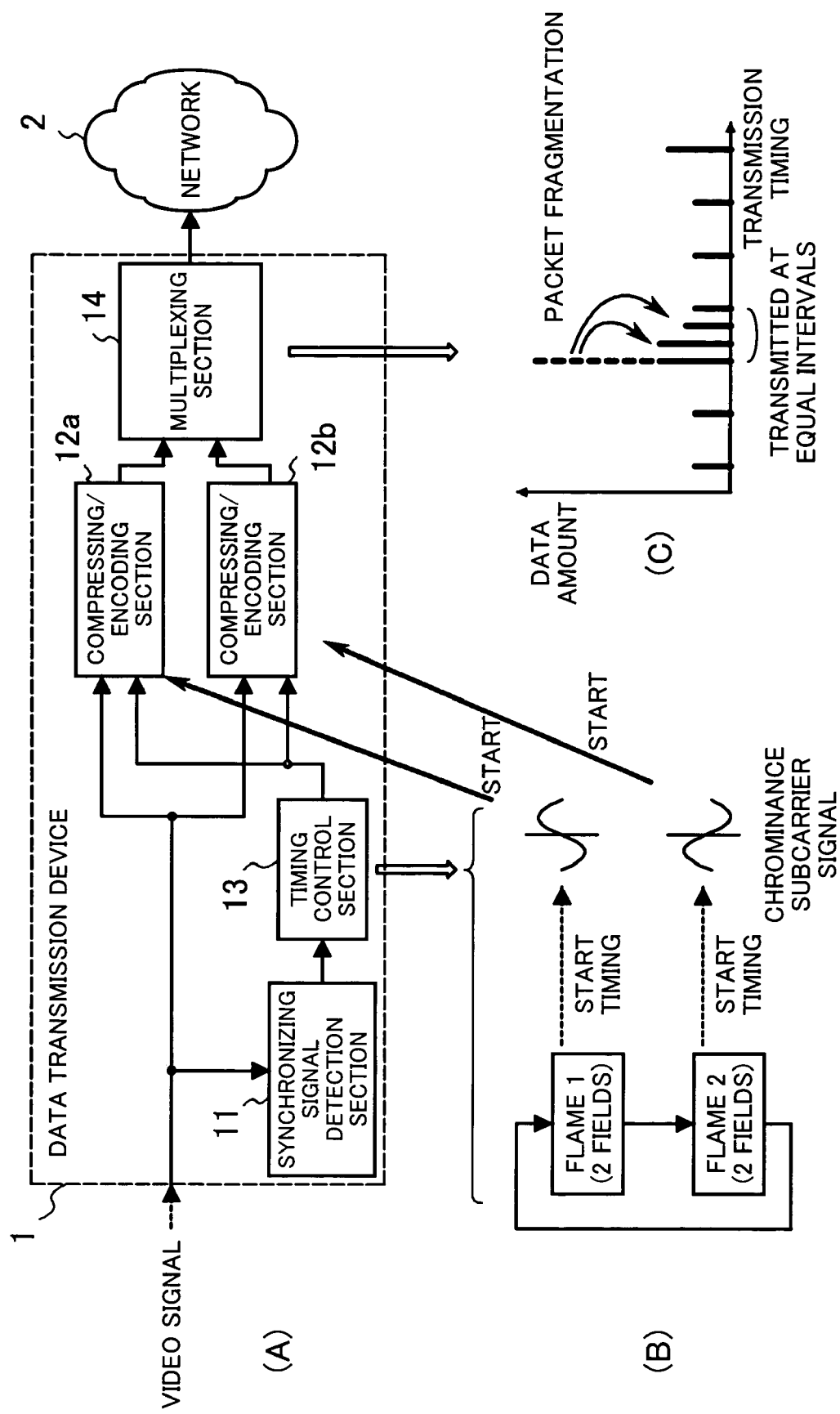
FIGS. 1(A) to 1(C) illustrate the principle of the present invention.

FIG. 1 illustrates the principle of the present invention.

A data transmission device 1 of the present invention is a device for compressing/encoding a video signal from a camera or the like and delivering a generated data stream in real time onto a network 2. In this case, since networks configured up to recipients can be either broadband or narrowband, a plurality of data streams of different bit rates are generated from a single video source, so as to match with the different bands, and are delivered simultaneously.

As shown in FIG. 1(A), the data transmission device 1 comprises a synchronizing signal detection section 11 for detecting a synchronizing signal from a video signal input thereto, compressing/encoding sections 12a and 12b for compressing/encoding the input video signal to generate data streams of different bit rates, respectively, a timing control section 13 for controlling the compressing/encoding sections 12a and 12b such that timings for starting compression/encoding processes in the compressing/encoding sections 12a and 12b are shifted from each other in units of frame, and a multiplexing section 14 for sequentially multiplexing the data streams generated by the respective compressing/encoding sections 12a and 12b and transmitting the multiplexed data onto the network 2. The example shown in FIG. 1 includes only two compressing/encoding sections, but three or more compressing/encoding sections may be provided.

The synchronizing signal detection section 11 detects a synchronizing signal necessary for the detection of start timing for a frame or field or horizontal scanning, demodulation of chrominance signals, etc., from the input video signal. In the case where NTSC (National TV Standards Committee) composite signal is input as the video signal, for example, vertical synchronizing signal, horizontal synchronizing signal, color synchronizing (color burst) signal, etc. are detected as the synchronizing signal. The detected synchronizing signal is supplied to the timing control section 13.

Using the thus-supplied synchronizing signal, the timing control section 13 controls the timings for starting the compression/encoding processes in the respective compressing/encoding sections 12a and 12b. In this case, the timings for starting the compression/encoding processes in the compressing/encoding sections 12a and 12b are controlled so as to be shifted from each other in units of frame.

Under the control of the timing control section 13, the compressing/encoding sections 12a and 12b compress/encode the input video signal at respective different bit rates, to generate moving picture data streams.

The multiplexing section 14 sequentially packetizes and multiplexes the data streams generated by the compressing/encoding sections 12a and 12b, and transmits the multiplexed data onto the network 2. Also, the multiplexing section 14 carries out control such that fragmented packets are generated in accordance with the amount of data generated by the individual compressing/encoding sections 12a and 12b and are transmitted at equal intervals within a unit time.

The compressing/encoding sections 12a and 12b are provided in the data transmission device 1 correspond in number to data streams to be generated and are operated in parallel. Thus, although there is a "shift" between the start timings for generating the respective data streams, no delay occurs in the subsequently generated data streams, making it possible to deliver image with remarkably enhanced simultaneity.

Operation of the data transmission device 1 will be now described on the assumption that NTSC (National TV Standards Committee) composite signal is input as the video signal.

The video signal input to the data transmission device 1 is supplied to the two compressing/encoding sections 12a and 12b as well as to the synchronizing signal detection section 11. Each of the compressing/encoding sections 12a and 12b receives, as the video signal, a digital video signal which has been obtained by processing the video signal in an A/D conversion section etc., not shown, and starts to compress/encode the video signal in accordance with a control signal from the timing control section 13.

The compressing/encoding sections 12a and 12b generate data with different compression ratios and different resolutions, but pictures are generated at the same intervals. In the case where the compression/encoding is performed using inter-frame prediction, the arrangements of pictures in the data streams generated by the respective compressing/encoding sections 12a and 12b are usually the same.

Thus, by shifting the start timings for the compression/encoding processes from each other in units of frame, the picture arrangements of the data streams generated by the respective compressing/encoding sections 12a and 12b can be made to differ from each other. As a consequence, the data amount of generated picture sharply increases at different timings between the data streams, whereby variation in the overall data amount of the generated data streams can be smoothed.

On the other hand, the synchronizing signal detection section 11 detects, as the synchronizing signal, a vertical synchronizing signal, a color synchronizing signal, etc. from the video signal, and outputs the detected signals to the timing control section 13. The timing control section 13 acquires frame (or field) start timing from the vertical synchronizing signal input thereto, and also generates a chrominance subcarrier signal synchronized with the color synchronizing signal. The chrominance subcarrier signal is used as a reference signal when separating chrominance signals in the input video signal, etc.

In the case of NTSC signal, the phase of the chrominance subcarrier signal is inverted every two fields (i.e., every frame). Accordingly, the timing control section 13 can easily acquire the shift amount corresponding to one frame by detecting the phase of the chrominance subcarrier signal at the frame start timing, as shown in FIG. 1(B), and can provide the compressing/encoding sections 12a and 12b with the start timings for their respective compression/encoding processes. Specifically, when the frame start timing synchronizes with the rise timing of the chrominance subcarrier signal, the compressing/encoding section 12a is instructed to start the process, and when the frame start timing thereafter synchronizes with the fall timing of the chrominance subcarrier signal, the compressing/encoding section 12b is instructed to start the process. This serves to smooth variation in the total data amount of the generated data streams.

The generated data streams are output to the multiplexing section 14. As shown in FIG. 1(C), when the amount of data generated per unit time by either of the compressing/encoding sections 12a and 12b is too large, the multiplexing section 14 generates fragmented packets carrying such data. For example, a reference value is set for the data amount to be carried by one packet, and if the amount of data corresponding to one picture (i.e., one frame) in either of the data streams exceeds the reference value, the picture data is fragmented into a plurality of packets. The thus-fragmented packets are transmitted at equal intervals within a unit time.

The packet transmission control described above makes it possible to further smooth variation in the amount of data transmitted to the network 2, to lower the peak bit rate of transmitting data, and to reduce the transmission load. The reference value specifying the data amount to be carried by one packet may be set as desired, taking account of the performance of the data transmission device 1 itself and the capacity of the network 2.

As described above, according to the present invention, the synchronizing signal detected from the input video signal is used so that the timings for starting the compression/encoding processes in the respective compressing/encoding sections 12a and 12b may be shifted from each other in units of frame. Consequently, a sudden increase in the amount of generated data takes place at scattered timings in the respective data streams, and since variation in the total amount of transmitting data can be smoothed as a result, packet loss etc. can be prevented from occurring due to increase in the network load.

Especially in the case where NTSC composite signal is used as the input, control timings for the compressing/encoding sections 12a and 12b can be derived with ease from the vertical synchronizing signal and color synchronizing signal detected from the input video signal. It is therefore possible to control the start timings for the compression/encoding processes without the need to use a counter circuit etc. for obtaining a shift amount of frame start timings, for example, and accordingly, the device can be reduced in cost and size.

Further, in accordance with the data amount of the data stream generated by each of the compressing/encoding sections 12a and 12b, the multiplexing section 14 generates fragmented packets carrying the data stream, and transmits the fragmented packets at equal intervals, whereby variation in the amount of data transmitted onto the network 2 can be made even smoother. In this manner, the present invention uses the start timing control for the compression/encoding processes in combination with the packetization control for generated data, whereby the effect of smoothing variation in the amount of data transmitted onto the network 2 can be enhanced without impairing simultaneity of transmitted data.

In the example described above, the timings for starting the compression/encoding processes are shifted from each other by one frame, but the start timings may be shifted from each other by two or more frames. Also, where three or more data streams of different bit rates are generated simultaneously, the process start timings of the respective compressing/encoding sections may be sequentially shifted in units of frame. In this case, however, the shift amount is preferably set to one frame, in order to more securely smooth variation in the amount of generated data.

An embodiment of the present invention will be now described in detail. In the following description, the invention is applied, by way of example, to a system for delivering image to recipients connected to an intranet such as a LAN (Local Area Network) in a corporation, or to the Internet.

Figure 2:
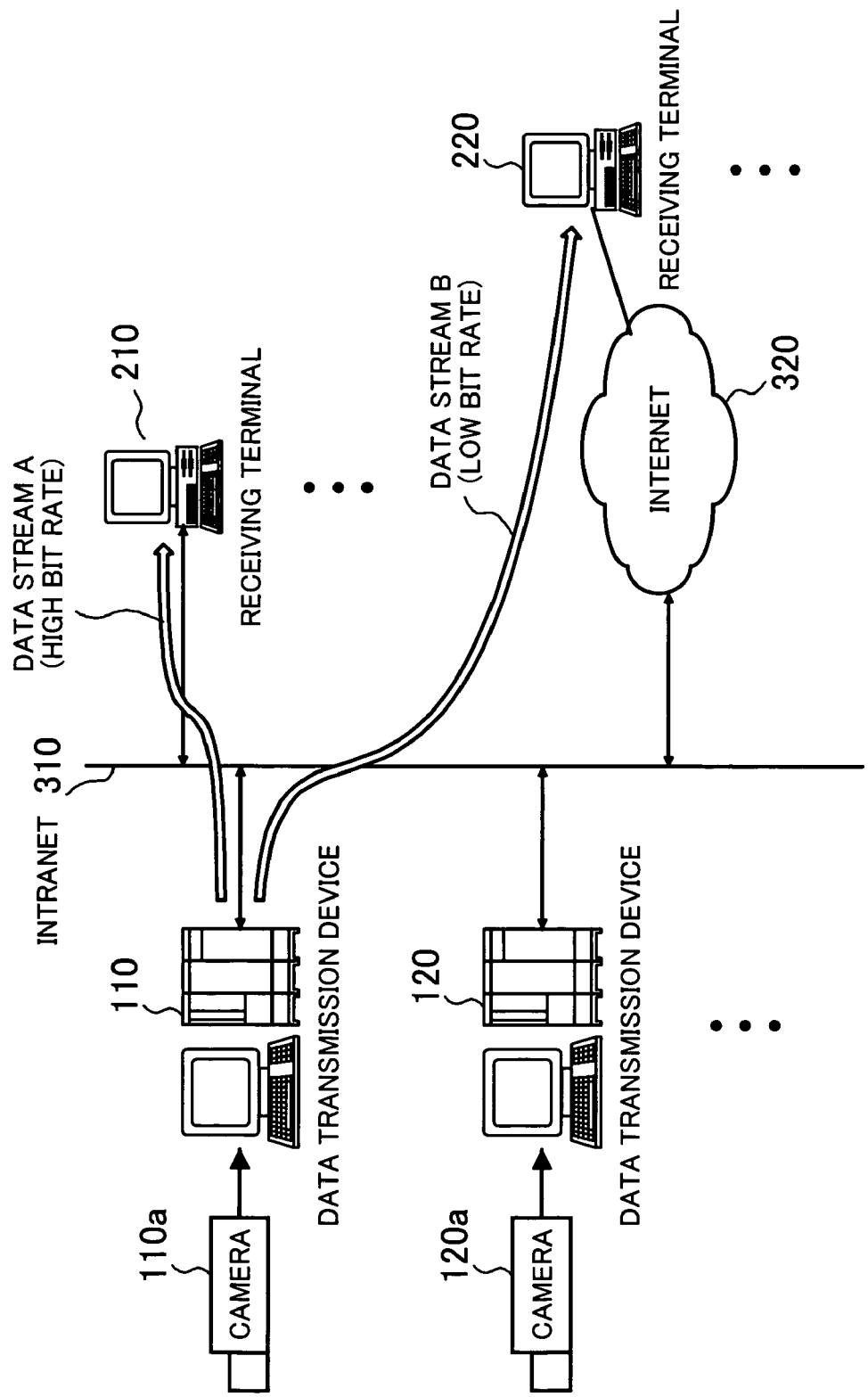
FIG. 2 is a diagram showing a system configuration of an image delivery system to which a data transmission device of the present invention is applicable.

FIG. 2 shows a system configuration of an image delivery system to which the data transmission device of the present invention can be applied.

The image delivery system shown in FIG. 2 generates data streams from images acquired by cameras 110a and 120a and delivers the generated data streams in real time to recipients through networks. The image delivery system is used, for example, to monitor the water levels of rivers or dams, roads, etc. from a remote location or to broadcast a conference or a concert live.

The image delivery system comprises data transmission devices 110 and 120 to which the cameras 110a and 120a are connected, respectively, and receiving terminals 210 and 220 for receiving moving picture data streams delivered from the data transmission devices 110 and 120. The data transmission devices 110 and 120 are connected through an intranet 310 to the Internet 320. The receiving terminal 210 is connected to the intranet 310, while the receiving terminal 220 is connected to the Internet 320 through, for example, a telephone line, not shown.

The cameras 110a and 120a each acquire an image and output the acquired image as NTSC composite signal. The data transmission devices 110 and 120 compress/encode the image signals from the respective cameras 110a and 120a in accordance with MPEG, and transmit the compressed/encoded data onto the intranet 310. The receiving terminals 210 and 220 have the function of receiving the thus-transmitted data streams through the intranet 310 and the Internet 320, respectively, decoding and displaying the data, and each comprise, for example, a computer such as a PC (Personal Computer).

The system may include larger numbers of data transmission devices and receiving terminals than illustrated. However, the data transmission devices need to be connected to the intranet 310.

The intranet 310 is a network that warrants high-speed data transmission/reception as a whole, compared with the Internet 320. The data transmission device 110 generates, based on a single video source from the camera 110a, data streams of different bit rates matching the respective transmission bands of the intranet 310 and Internet 320, and transmits the generated data streams. This is the case with the data transmission device 120.

Accordingly, of the data streams delivered from the data transmission device 110, for example, a data stream A with a relatively high bit rate of several Mbps can be received properly by the receiving terminal 210, and a data stream B with a relatively low bit rate of several hundred kbps can be received properly by the receiving terminal 220, as shown in FIG. 2.

Each of the data transmission devices 110 and 120 transmits data by multicasting, for example, and the receiving terminals 210 and 220 can select the bit rate at which they are to receive the data stream.

Figure 3:
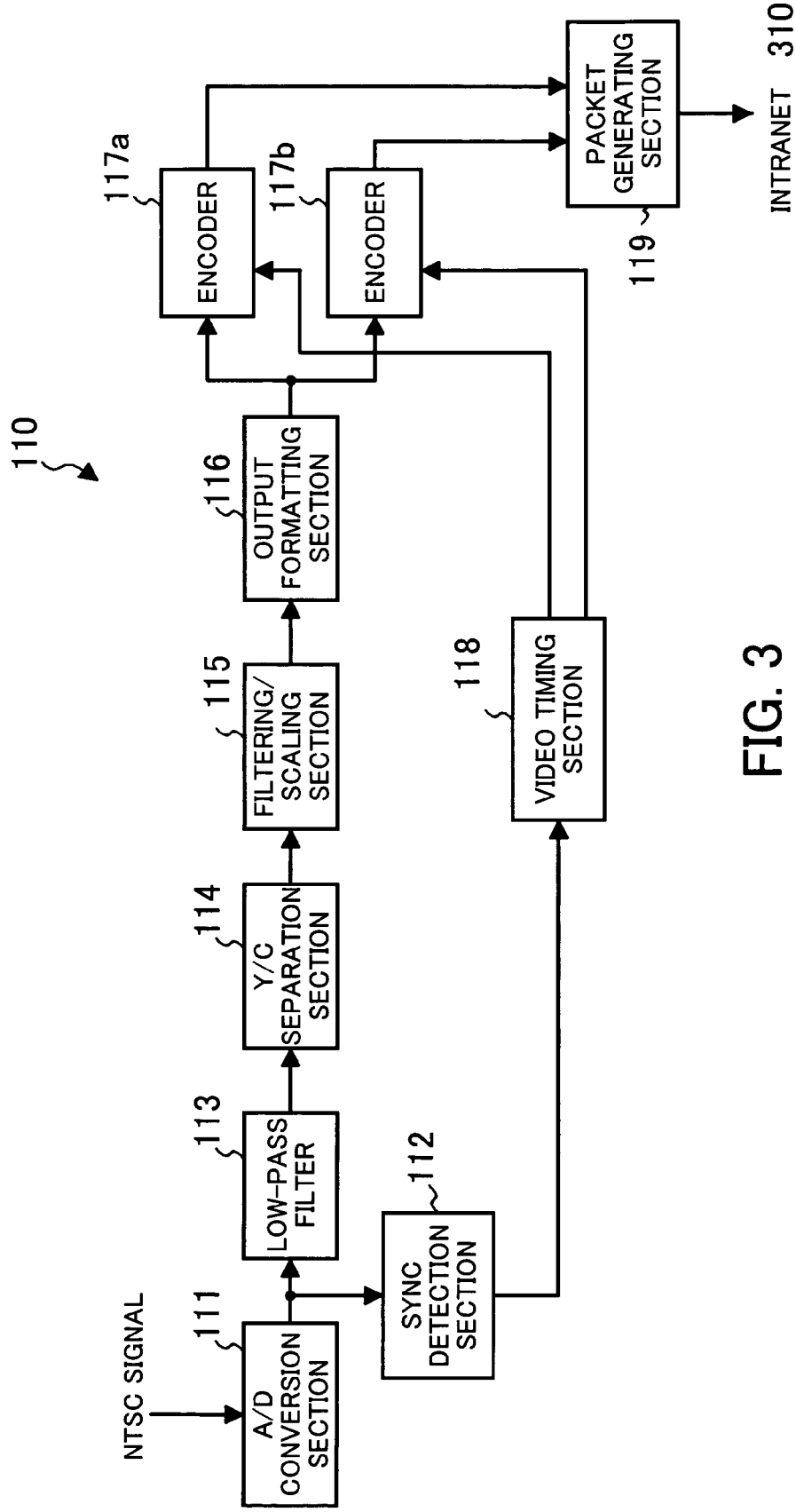
FIG. 3 is a block diagram illustrating functions of a data transmission device according to one embodiment of the present invention.

Processing functions of the data transmission device 110, as an example, will be now described. FIG. 3 is a block diagram illustrating the functions of the data transmission device 110.

As shown in FIG. 3, the data transmission device 110 comprises an A/D conversion section 111, a sync detection section 112, a low-pass filter 113, a Y/C separation section 114, a filtering/scaling section 115, an output formatting section 116, encoders 117a and 117b, a video timing section 118, and a packet generating section 119.

The A/D conversion section 111 samples the NTSC composite signal transmitted from the camera 110a and converts the signal to a digital video signal. The sync detection section 112 detects a vertical synchronizing signal, a horizontal synchronizing signal and a color synchronizing signal from the digital video signal converted by the A/D conversion section 111, and outputs the detected signals to the video timing section 118.

The low-pass filter 113 passes only low-frequency components of the video signal from the A/D conversion section 111, to thereby remove noise. The Y/C separation section 114 separates the video signal supplied from the low-pass filter 113 into a luminance signal and color differential signals.

The filtering/scaling section 115 performs resolution conversion and effective image area cropping on the video signal which has been subjected to the Y/C separation. The output formatting section 116 buffers, on a frame-by-frame basis, the video signal supplied from the filtering/scaling section 115, and provides a non-interlaced video signal.

The encoders 117a and 117b each receive the video signal from the output formatting section 116 and, in accordance with respective predetermined resolutions and compression ratio settings, compress/encode the video signal according to MPEG-2. In this case, the encoder 117a generates a data stream A with a relatively high average bit rate of several Mbps, for example, and the encoder 117b generates a data stream B with a relatively low average bit rate of several hundred kbps, for example. The encoders 117a and 117b generate pictures in response to the same field start signal from the video timing section 118, as described later, and accordingly, no delay of data occurs as a result of the compression/encoding processes by these encoders, thus permitting very nearly real-time generation of data with respect to the original video signal.

The video timing section 118 receives the synchronizing signals detected by the sync detection section 112 and controls the operation timings of the encoders 117a and 117b, etc. Using the color synchronizing signal from the sync detection section 112, the video timing section 118 generates a 14.318-MHz synchronizing signal, which is a reference signal for the synchronization of video signal within the data transmission device 1. This synchronizing signal is used as a sampling frequency by the A/D conversion section 111, for example, and also the vertical and horizontal synchronizing signals from the sync detection section 112 are synchronized with this synchronizing signal. Further, the video timing section 118 generates a chrominance subcarrier signal (3.5785 MHz) synchronized with this synchronizing signal.

The video timing section 118 generates field and frame start signals based on the vertical synchronizing signal, as described later, and also outputs the chrominance subcarrier signal in order to control the frame start timings and compression/encoding start timings of the individual encoders 117a and 117b by means of these signals. A detailed configuration for controlling such operation start timings will be described with reference to FIG. 4.

On receiving the data streams generated by the respective encoders 117a and 117b, the packet generating section 119 assembles the data into IP (Internet Protocol) packets, multiplexes the packets, and then sends the multiplexed packets onto the intranet 310.

Figure 4:
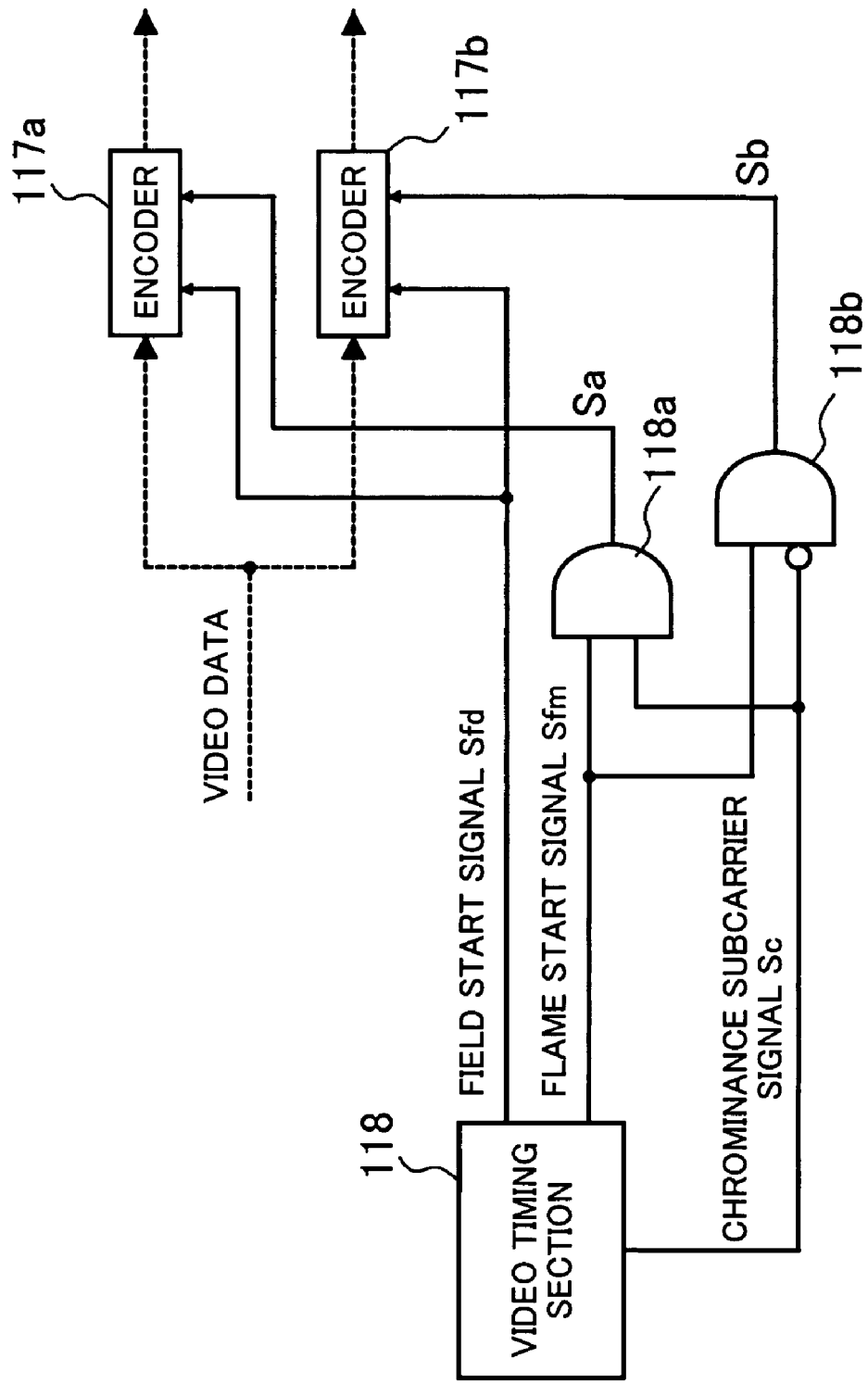
FIG. 4 is a diagram showing a configuration of a signal system for controlling operation start timings for individual encoders.

FIG. 4 illustrates the configuration of a signal system for controlling the operation start timings of the encoders 117a and 117b.

To control the operation start timings of the encoders 117a and 117b, the video timing section 118 outputs the field start signal Sfd, frame start signal Sfm and chrominance subcarrier signal Sc.

The field start signal Sfd is a pulse signal synchronized with rise timing of the vertical synchronizing signal, and provides the encoders 117a and 117b with field start timing.

The frame start signal Sfm is output once for every two pulses of the field start signal Sfd and is input to two AND gates 118a and 118b. The other input terminal of the AND gate 118a is input with the chrominance subcarrier signal Sc, and the other input terminal of the AND gate 118b is input with a phase-inverted signal of the chrominance subcarrier signal Sc. Output signals of the AND gates 118a and 118b are input to the encoders 117a and 117b, respectively, thereby providing the encoders 117a and 117b with their respective compression/encoding start timings.

Figure 5:
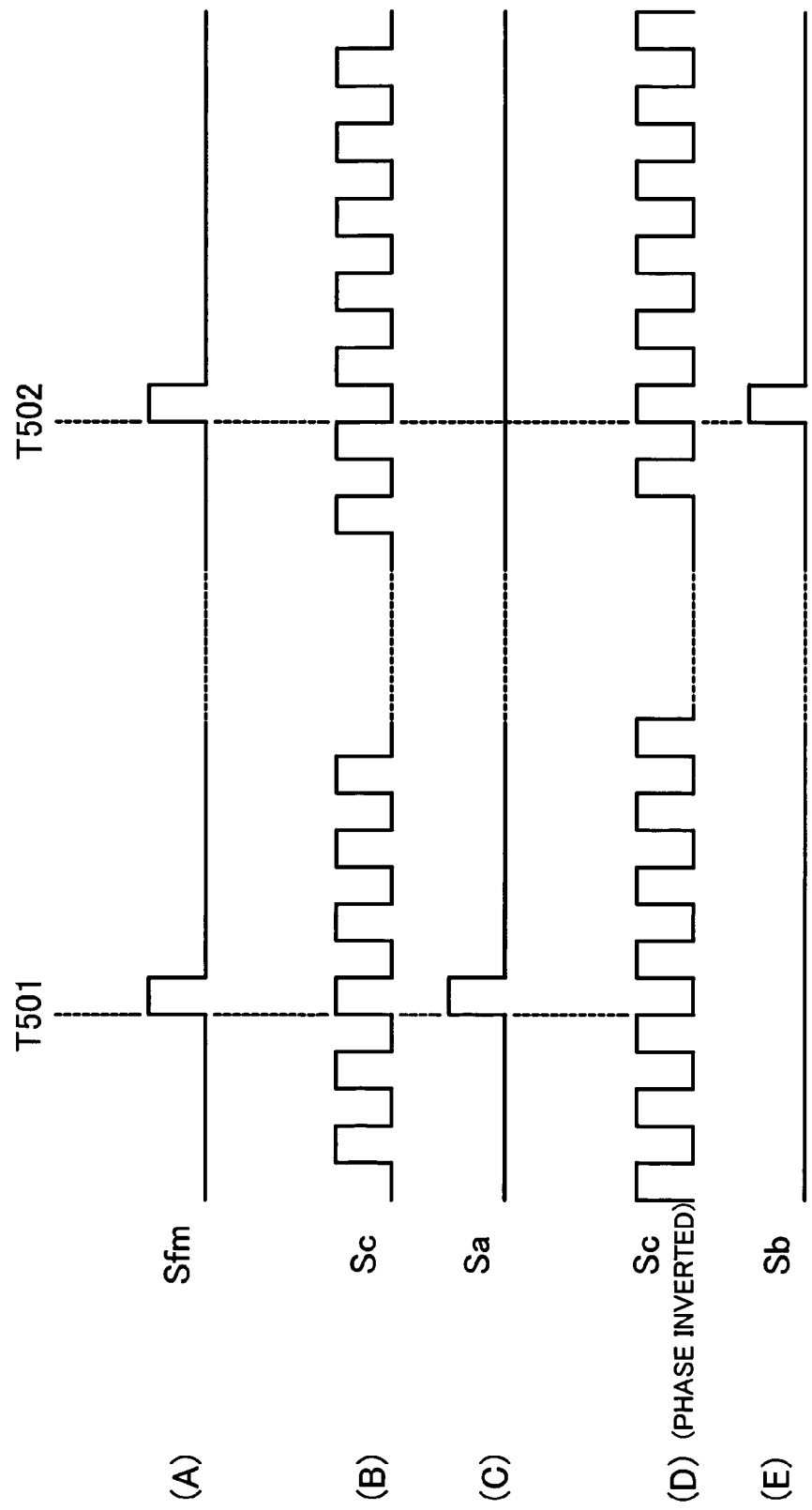
FIGS. 5(A) to 5(E) are a time chart showing waveforms of signals sent to the individual encoders from a video timing section.

FIG. 5 is a time chart showing the waveforms of signals transmitted to the encoders 117a and 117b from the video timing section 118.

In an NTSC system, the field period and the chrominance subcarrier signal maintain a relationship such that they are synchronized once in every four fields, and the phase of the chrominance subcarrier signal is inverted every two fields (i.e., every frame). Accordingly, if timing T501 at which a pulse of the frame synchronizing signal Sfm is output as shown in FIG. 5(A) coincides with rise timing of the chrominance subcarrier signal Sc shown in FIG. 5(B), the timing T502 at which the next pulse of the frame synchronizing signal Sfm is output coincides with fall timing of the chrominance subcarrier signal Sc.

Thus, when the compressing/encoding sections 12a and 12b are instructed to start their processes, the start signal Sa is output from the AND gate 118a at the timing T501 when the frame start signal Sfm is output for the first time after the reception of the instruction, as shown in FIG. 5(C). In response to the start signal Sa, the operation of the encoder 117a is started.

The AND gate 118b is input with the phase-inverted signal of the chrominance subcarrier signal Sc, and at the next frame start timing T502, rise timings of the phase-inverted signal and frame start signal Sfm coincide with each other, as shown in FIG. 5(D). Thus, the start signal Sb is output from the AND gate 118b, as shown in FIG. 5(E), and the operation of the encoder 117b is started. As a result, the operation start timing of the encoder 117b is delayed by one frame from that of the encoder 117a.

In the illustrated example, the frame start signal Sfm is used for comparison with the phase of the chrominance subcarrier signal Sc, but the field start signal Sfd may be used instead.

Figure 6:
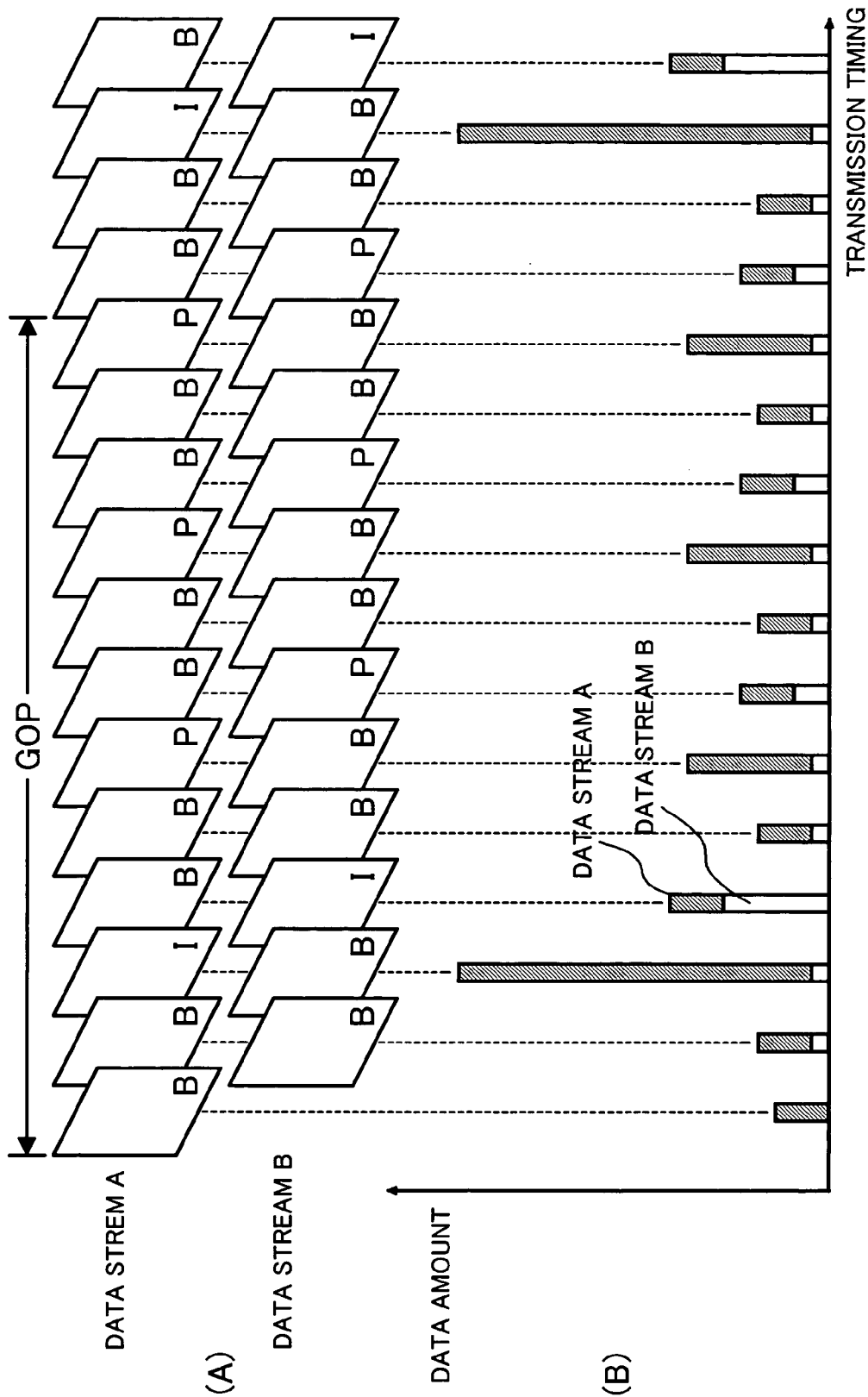
FIGS. 6(A) and 6(B) illustrate arrangements of pictures in respective generated data streams and amounts of generated data.

FIG. 6 illustrates picture arrangements of individual data streams and amounts of data generated when the operation start timings are controlled in the manner described above.

The data streams A and B generated by the encoders 117a and 117b, respectively, have a picture arrangement such that one I or P picture is preceded and followed by two B pictures, as shown in FIG. 6(A). Also, in both data streams A and B, one GOP includes the same number of pictures.

Since the timing for starting the compression/encoding process in the encoder 117b is delayed by one frame from the operation start timing of the encoder 117a, the individual pictures appearing in the generated data streams A and B are shifted from each other by one frame, as shown in FIG. 6(A). Thus, the I or P pictures of the data streams A and B invariably appear at different positions.

FIG. 6(B) shows the amount of data generated for each picture in the individual data streams A and B. As seen from the figure, in both data streams A and B, the data amount of I picture is especially large, compared with the data amount of B picture. However, since the I pictures of the data streams A and B appear at different positions, variation in the total amount of data generated per frame in the two data streams can be smoothed, compared with the case where the I pictures are generated at the same time.

The timings for starting the respective compression/encoding processes are controlled by the video timing section 118 in the aforementioned manner, whereby variation in the total data amount of the data streams generated by the encoders 117a and 117b can be smoothed. To this end, the video timing section 118 uses control signals which are generated based on the synchronizing signals included in the original video signal. The control signals used in this case are the synchronizing signals which are generated also in conventional devices to cause the encoders 117a and 117b to start processing the digital video signal converted from an input analog video signal. Therefore, the aforementioned timing control for the compression/encoding processes can be implemented by simply adding circuitry including AND gates, and thus with a simple structure, whereby increase in the cost of the device and in the installation space therefor can be minimized.

Figure 7:
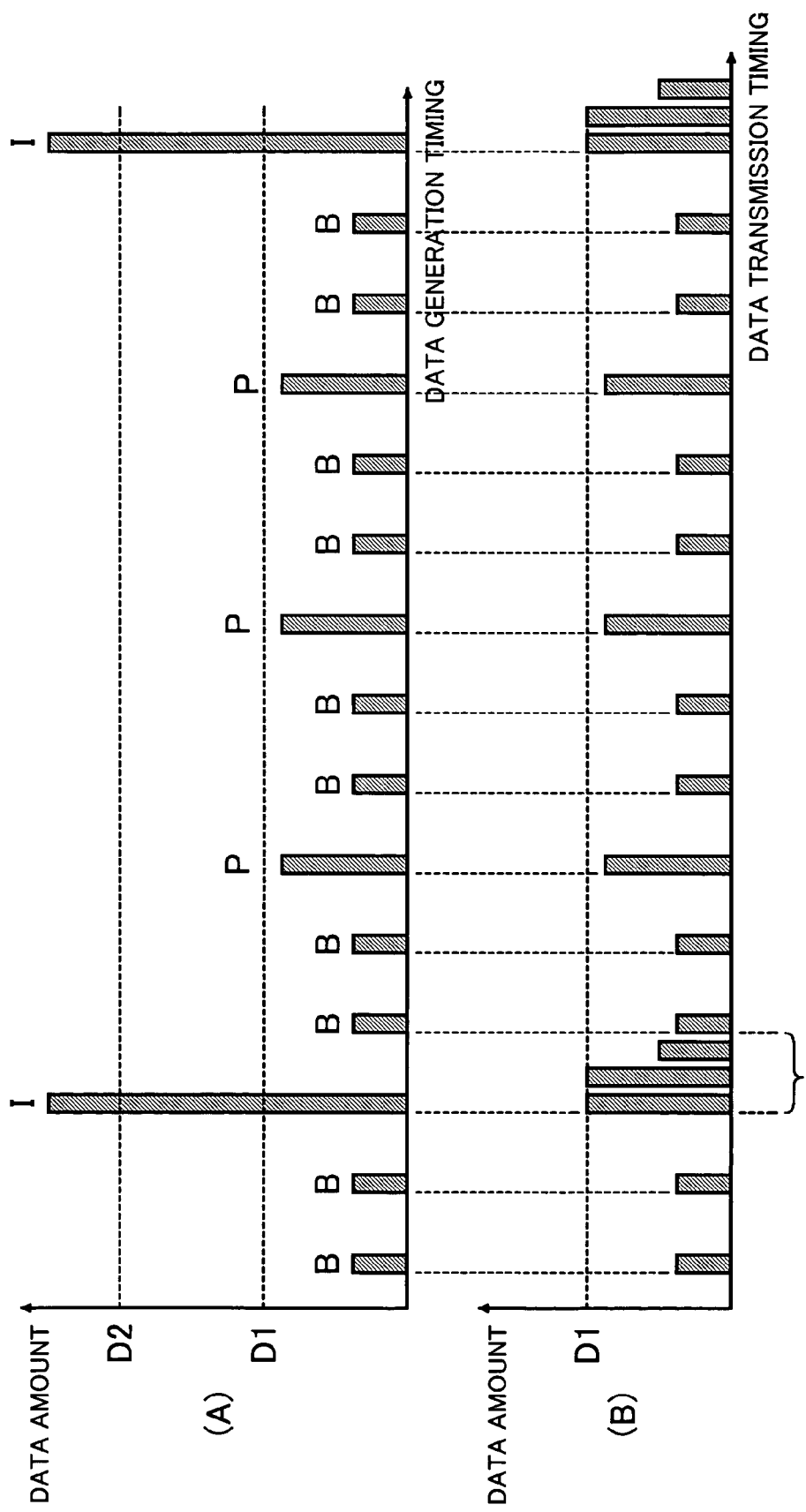
FIGS. 7(A) and 7(B) illustrate data amounts of respective pictures in a generated data stream and packets carrying the pictures.

The following describes how variation in the amount of transmitting data is smoothed by the packet generating section 119. FIG. 7 illustrates the data amounts of respective pictures generated in the data stream A or B and packets carrying the pictures.

FIG. 7(A) shows the data amount of each picture in the data stream A generated by the encoder 117a, by way of example. As seen from the figure, the I picture shows an extremely large data amount within the data stream, as compared with the B or P picture. Thus, the packet generating section 119 sets a reference value D1 as an upper limit for the data amount to be carried by one packet. In the figure, D2 indicates a data amount which is twice the reference value D1.

In the illustrated example, the data amounts of I pictures are greater than the reference value D1, and in such cases, the packet generating section 119 fragments the picture data into a plurality of packets. FIG. 7(B) shows the amounts of data carried by respective packets and the timings for transmitting the packets.

As shown in FIG. 7(B), a picture whose data amount does not exceed the reference value D1 is contained in one packet and transmitted at the frame period. On the other hand, for a picture whose data amount is larger than the reference value D1, an amount of picture data corresponding to the reference value D1 as the upper limit is contained in one packet while the remaining data is contained in a separate packet(s). In the case of the I pictures shown in the figure, their data amount exceeds twice the reference value D1, and accordingly, each I picture is fragmented and contained in three packets.

The packets fragmented in this manner are sequentially transmitted at respective timings which are obtained by equally dividing the period up to the next packet transmission timing for transmitting the subsequent picture by the number of generated or fragmented packets. This permits a large amount of I picture data to be transmitted in a distributed manner within the transmission period allocated to one picture, making it possible to prevent packet loss etc. from being caused due to sudden increase in the transmission load on the network (intranet 310).

Figure 8:
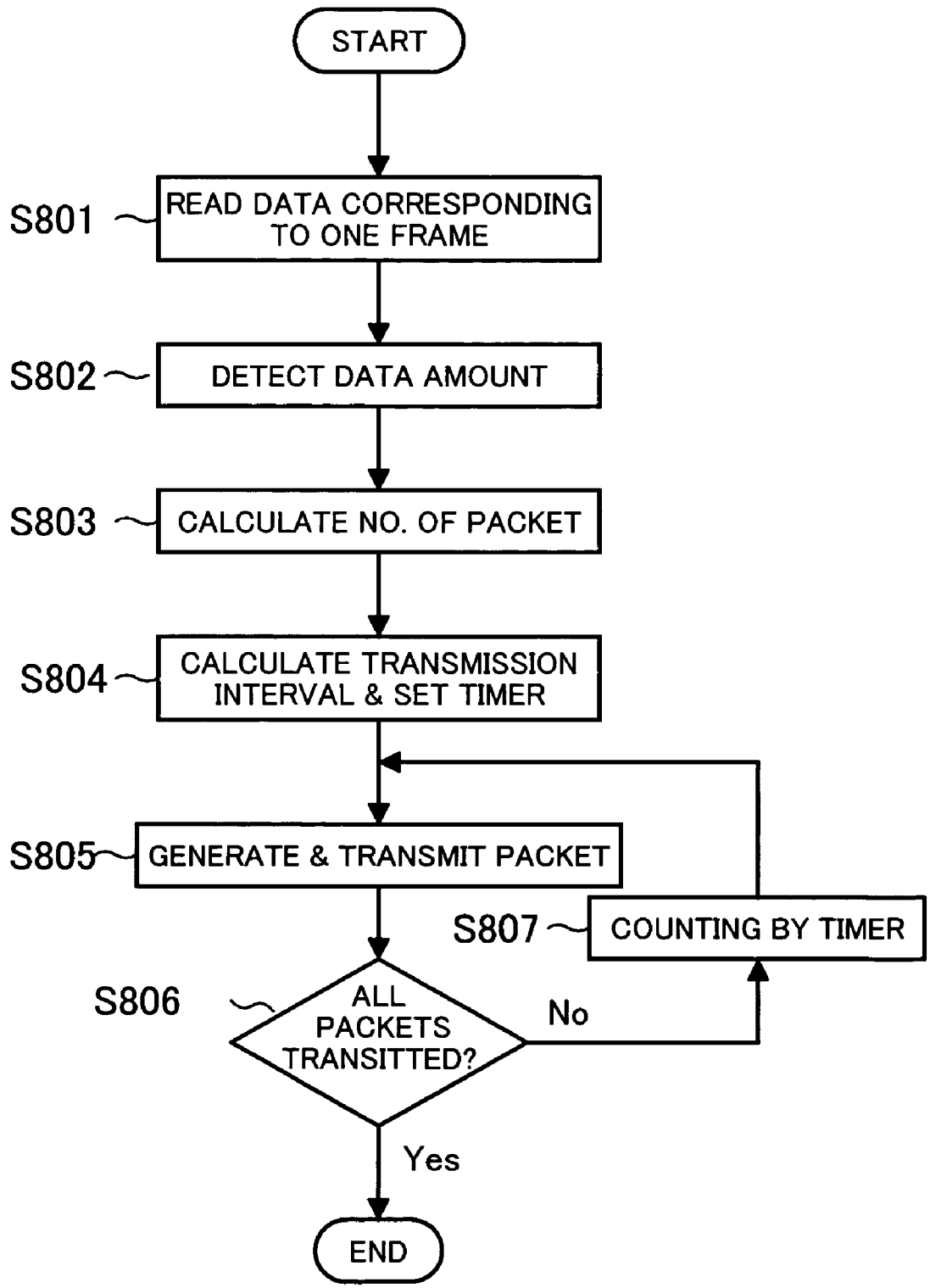
FIG. 8 is a flowchart illustrating a process performed on each of the data streams by a packet generating section.
Figure 9:
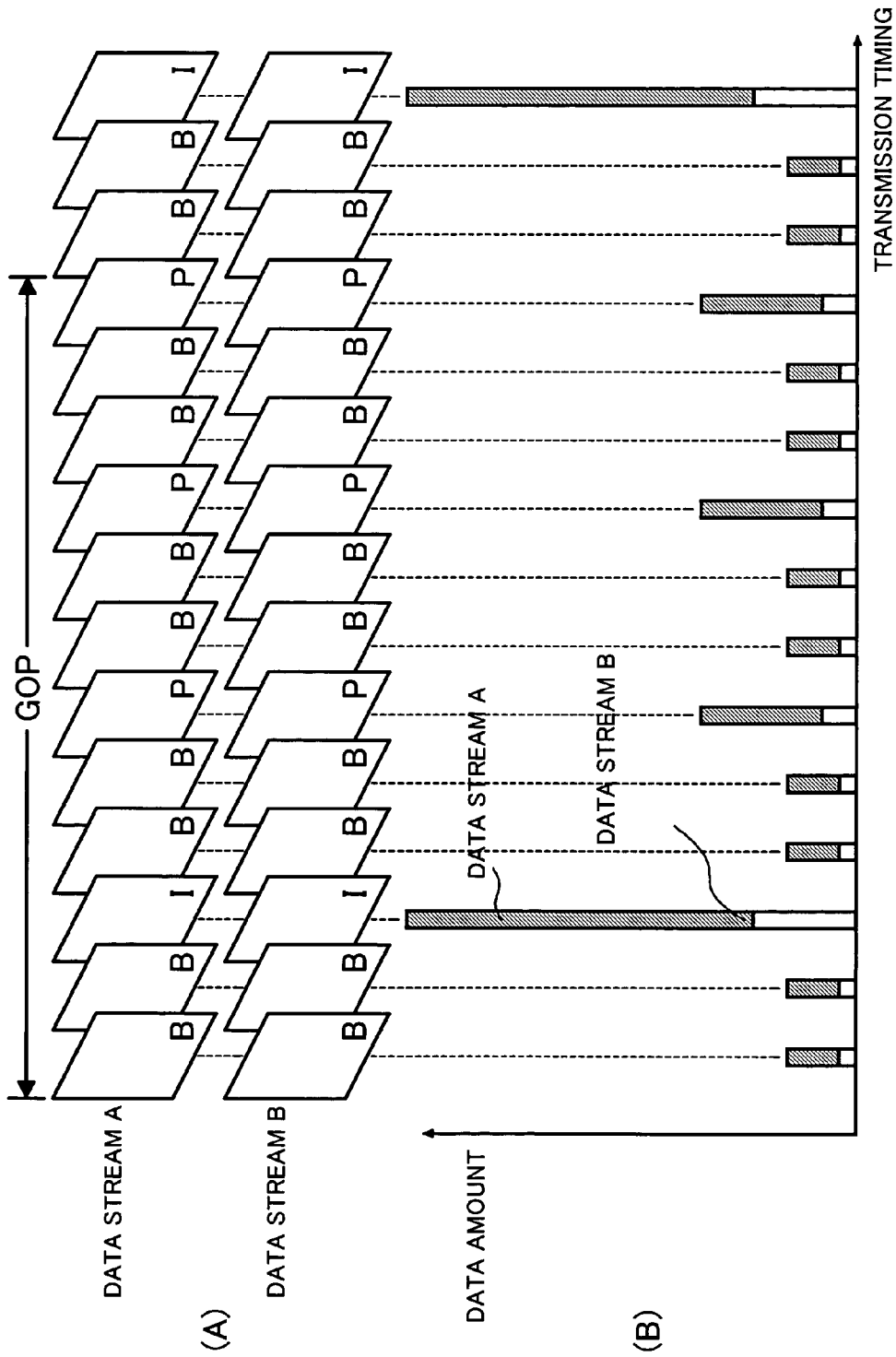
FIGS. 9(A) and 9(B) illustrate variation in data amount observed when a plurality of compressed/encoded data of different bit rates are delivered simultaneously.

FIG. 8 is a flowchart showing a process performed on each of the data streams A and B by the packet generating section 119.

The packet generating section 119 is provided, for example, with buffers for receiving input data from the encoders 117a and 117b, respectively. In Step S801, data corresponding to one frame, that is, one picture, is read from the buffer, and in Step S802, the data amount of the picture thus read out is detected.

Then, in Step S803, the detected data amount is compared with the packetization reference value D1, to calculate the number of packets to be generated. If the detected data amount exceeds n times the reference value D1 and at the same time is smaller than or equal to (n+1) times the reference value, (n+1) is set as the number of packets to be generated to carry the data.

In Step S804, an interval for transmitting the fragmented packets is calculated from the calculated number of packets. In the case where (n+1) has been set as the number of packets as mentioned above, a value obtained by dividing 1/30 second, which is the transmission interval allocated to one picture, by the number of packets, (n+1), is set as the interval for transmitting the fragmented packets. The packet generating section 119 is also provided with a timer for counting the packet transmission interval, and sets the timer to count the calculated transmission interval.

Subsequently, in Step S805, predetermined header information and the like are affixed to the data corresponding in amount to the reference value D1 to generate a first UDP (User Datagram Protocol) packet, and transmits the packet at predetermined frame synchronization timing onto the intranet 310.

In Step S806, it is determined whether or not all of the packets corresponding to one picture have been transmitted. If all of the packets have been transmitted, the process for this picture is ended, whereupon the process is again executed from Step S801 to transmit the next picture. On the other hand, if there is a packet or packets which are not transmitted yet, the process proceeds to Step S807.

In Step S807, the timer count is monitored to wait until a time period corresponding to the transmission interval set in Step S804 elapses. Upon lapse of the set time period, the process returns to Step S805 to generate and transmit the next packet. Steps S805 to S807 are repeated thereafter until transmission of all packets corresponding to one picture is completed.

The process shown in FIG. 8 is a process performed on one data stream. With respect to the packets corresponding to the two pictures of the respective data streams A and B, the packet generating section 119 continuously transmits the packets at the timing of the same frame period. Because of the process start timing control carried out by the video timing section 118, an I picture, which has a large data amount, is never generated simultaneously in both data streams A and B. Usually, therefore, packet fragmentation is not simultaneously carried out in both data streams A and B. Thus, when picture data of the data stream A, for example, is fragmented, the packet of the data stream B may be continuously transmitted immediately after the first packet of the data stream A is transmitted.

The reference value D1 specifying the data amount to be carried by one packet can be changed as desired. Accordingly, the data transmission amount can be controlled appropriately taking account of the performance of the data transmission device 110 itself as well as the capacity and communication state of the intranet 310 to which data is transmitted.

Thus, in the embodiment described above, the timings for starting the respective compression/encoding processes are controlled by the video timing section 118 while at the same time the transmission is controlled by the packet generating section 119 such that fragmented packets are generated in accordance with the amount of generated data and are transmitted at equal intervals, whereby variation in the amount of transmitting data can be easily smoothed without impairing simultaneity of transmitting data.

As described above, in the data transmission device of the present invention, the timing control section controls the timings for starting the compression/encoding processes in the respective compressing/encoding sections so as to be offset in units of frame. Accordingly, the compressing/encoding sections generate data streams having respective different picture arrangements, and thus, the data amounts of generated pictures increase and decrease at different timings in the respective data streams, making it possible to smooth variation in the total amount of data transmitted to the network. Also, the timing control of the timing control section is carried out based on synchronizing signals detected by the synchronizing signal detection section, whereby the device can be simplified in structure. Further, the multiplexing section generates fragmented packets carrying the individual data streams in accordance with amounts of data generated per unit time by the respective compressing/encoding sections and transmits the fragmented packets at equal intervals within the unit time, whereby variation in the amount of data transmitted to the network can be made even smoother.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transmission device for generating a plurality of compressed/encoded data of different bit rates from a single video signal and simultaneously transmitting the compressed/encoded data onto a network, comprising:

a synchronizing signal detection section for detecting a vertical synchronizing signal and a color synchronizing signal from the video signal input thereto, wherein the video signal comprises an NTSC composite signal;

a plurality of compressing/encoding sections for compressing/encoding the video signal to generate data streams of different bit rates, respectively, wherein the compressing/encoding sections generate data streams having the same sequence of picture types;

a timing control section for controlling said compressing/encoding sections in accordance with the detected synchronizing signal such that timings for starting compression/encoding processes in said compressing/encoding sections are shifted from one another in units of frame; and a multiplexing section for sequentially multiplexing the data streams generated respectively by said compressing/encoding sections and transmitting the multiplexed data onto the network, wherein the timing control section causes one of said compressing/encoding sections to start the compression/encoding process when frame start timing of the video signal derived based on the vertical synchronizing signal coincides with rise timing of a chrominance subcarrier signal synchronized with the color synchronizing signal, and causes a different one of said compressing/encoding sections to start the compression/encoding process when the frame start timing coincides thereafter with fall timing of the chrominance subcarrier signal.

2. The data transmission device according to claim 1, wherein said multiplexing section generates fragmented packets carrying the individual data streams in accordance with amounts of data generated per unit time by said compressing/encoding sections, respectively, and transmits the fragmented packets at equal intervals within the unit time.

3. The data transmission device according to claim 2, wherein said multiplexing section sets a reference amount of data to be carried by one packet, and if an amount of data generated by any one of said compressing/encoding sections during a data generation period corresponding to one frame exceeds n times (n is an integer greater than zero) the reference amount, said multiplexing section fragments and carries the generated data into (n+1) fragmented packets each having a data amount equal to or smaller than the reference amount and sequentially transmits the fragmented packets at equal intervals obtained by equally dividing the data generation period by the number of the fragmented packets.

4. The data transmission device according to claim 3, wherein said reference amount can be set to a desired value.

5. A data transmission method for generating a plurality of data streams of different bit rates by compressing/encoding a single video signal such that data streams generated by compression/encoding have the same sequences of picture types, and for simultaneously transmitting the data streams onto a network, comprising the steps of:

detecting a vertical synchronizing signal and a color synchronizing signal from the input video signal, wherein the video signal comprises an NTSC composite signal;

shifting start timings for compression/encoding processes corresponding to the generation of the respective data streams from one another in units of frame in accordance with the detected synchronizing signal, wherein one of said compressing/encoding processes is started when frame start timing of the video signal derived based on the vertical synchronizing signal coincides with rise timing of a chrominance subcarrier signal synchronized with the color synchronizing signal, and a different one of said compressing/encoding processes is started when the frame start timing coincides thereafter with fall timing of the chrominance subcarrier signal; and generating fragmented packets carrying the individual data streams in accordance with amounts of data generated per unit time by the respective compression/encoding processes, and transmitting the fragmented packets onto the network at equal intervals within the unit time.

* * * * *